Feb. 19, 1952     O. M. SUMMERS     2,586,739

GAS SEAL

Filed June 23, 1947

INVENTOR
OTTO M. SUMMERS
BY HIS ATTORNEYS

Howson & Howson

Patented Feb. 19, 1952

2,586,739

UNITED STATES PATENT OFFICE 2,586,739

GAS SEAL

Otto Murray Summers, Abington, Pa., assignor to Linear, Inc., Philadelphia, Pa., a corporation of Pennsylvania Application June 23, 1947, Serial No. 756,401

5 Claims. (Cl. 286—11.15)

This invention relates to seals adapted to be installed between a rotating shaft and surrounding relatively stationary structure, and more particularly to such a seal designed to retain high pressure gases, liquids, or mixtures of gases and liquids.

The invention contemplates the use of a rotating sealing member supported by a shaft and a stationary sealing element held in alignment by the shaft and providing a gas tight seal with respect to the shaft housing. A bearing surface is provided both on the rotating and sealing elements between which a floating annular sealing ring is compressed so that any wear takes place on inexpensive and readily replaceable parts rather than on the periphery of the shaft itself. Therefore, an important advantage of the construction resides in the fact that no heat treating or special grinding of the shaft to provide a sealing and wearing surface is required.

The construction is primarily adapted to seal relatively high pressure gases but is also effective to seal liquids or any mixture of gas and liquid. Effective sealing and long life are obtained by means of very accurate alignment between the sealing elements plus provision for retaining this accuracy over long periods of usage and means for dissipating heat generated by frictional contact of the sealing elements.

A primary object, therefore, of the invention is to provide a rotatable sealing member or collar adapted to be quickly installed on the shaft and a resilient lock for the collar which serves both to seal the collar with respect to the shaft and to prevent relative rotation between the shaft and the collar in operation.

A further object is to provide a driving seal and structure which in addition to sealing and driving the collar, induces limited pivotal action of the collar with respect to the shaft to provide accurate alignment of the sealing surfaces.

A further object of the invention is to provide a stationary sealing member adapted to be resiliently retained in alignment with the rotating sealing member.

A further object of the invention is to provide frictional sealing surfaces on the rotating collar and the stationary washer for resiliently contacting a non-metallic floating seal.

Another object of the invention is to provide a resilient compression washer for the stationary sealing element having relief grooves to permit pre-determined sealing compression of the washer.

A still further object is to provide a method whereby a loosely fitting collar may be resiliently mounted on a shaft without injury to the resilient mounting.

Further objects will be apparent from the specification and drawings in which.

Figure 1:
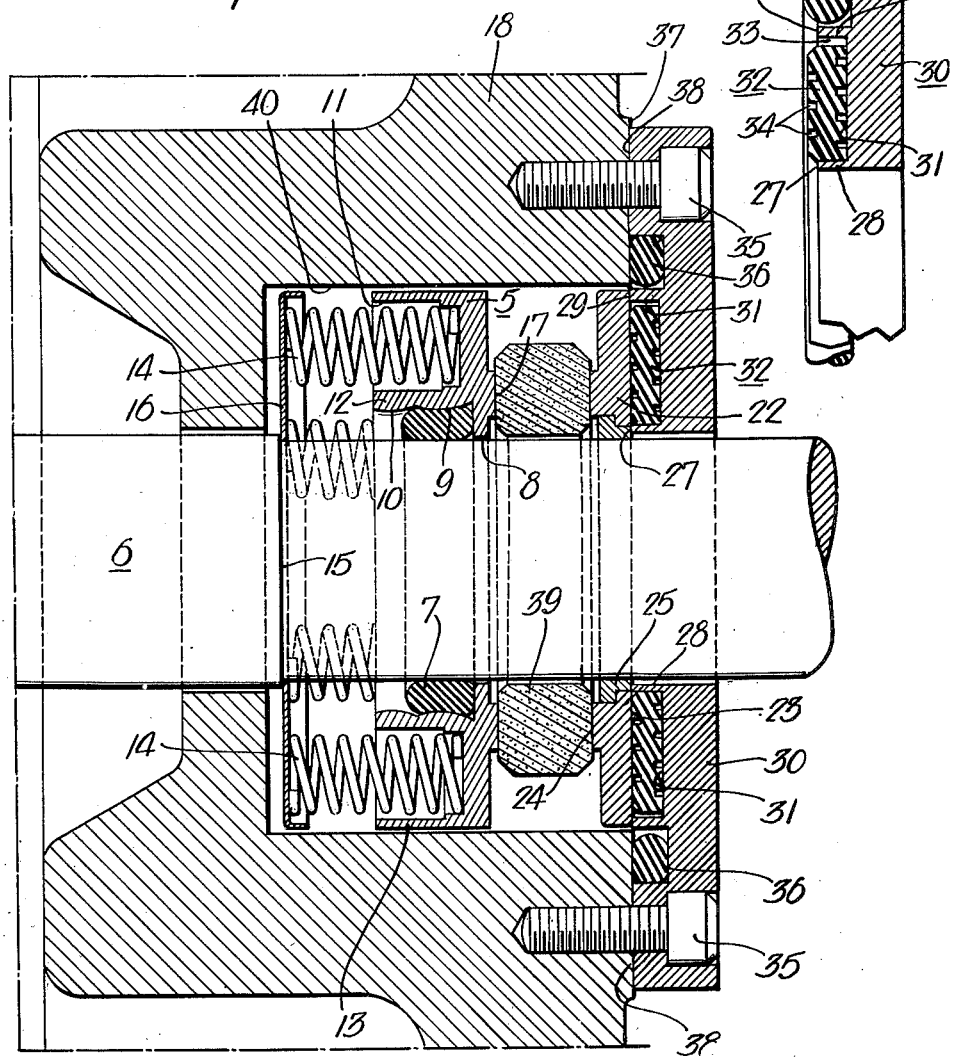
Fig. 1 is a sectional view of a high pressure seal and complementary structure designed in accordance with the invention.

The important features of the sealing structure reside in a spring-loaded collar resiliently sealed to the shaft in such a way that slight pivotal action of the collar with respect to the shaft is permitted in order to make the alignment of the collar independent of the axial position of the shaft to a limited extent. The shaft is provided with a shoulder carrying a spring retaining element against which a plurality of helical springs act to urge the collar axially on the resilient seal. A stationary sealing washer is retained in radial alignment with the shaft by means of a non-sealing bearing in the bore of the washer and is compressed against a flat resilient seal in an end plate by means of the helical springs acting through the collar and a floating annular carbon seal positioned between polished sealing surfaces on the collar and the washer. Accurate alignment of the stationary washer both axially and pivotally is provided by means of machined surfaces of the washer and the end plate.

Referring in more detail to the drawings, rotating collar 5 is mounted on and driven by shaft 6 by means of a resilient washer or O ring 7 compressed between the periphery of shaft 6 and the bore of collar 5. Ring 7 is preferably made of an oil resistant material such as synthetic rubber and may be one of a number of such devices readily available on the market. The composition of the ring 7 will be selected in accordance with the gas or liquid intended to be used in the particular installation. The bore of collar 5 has an inner flare or flange 8 on the side of the collar away from gas or liquid pressure. Sufficient clearance between the inside diameter of flange 8 and the outside diameter of shaft 6 is provided to permit a limited pivoting or twisting action of the collar on convex ridge 9 which forms the portion of the bore of collar 5 in radial contact with ring 7. A second convex portion of the bore is provided at 10 on the pressure side of collar 5 and serves to retain ring 7 in axial contact with the inside face of flange 8.

The outer periphery of collar 5 is extended to form an annular groove 11 opening axially of shaft 6 towards the pressure side of the collar. The deep sides 12 and 13 which form groove 11 serve as retainers for helical springs 14 and also to provide large area for the dissipation of heat. Shaft 6 has a shoulder 15 on the pressure side of collar 5 on which is mounted a spring retaining washer 16 and against which springs 14 abut. The opposite lateral face of collar 5 has a highly polished sealing surface 17 which in the preferred embodiment takes the form of an annular shoulder on the collar having an inside diameter somewhat greater than the inside diameter of flange 8 and an outside diameter considerably less than the major or outside diameter of the entire collar. The purpose of this construction is to permit cooling of the wearing surface 17 both through radiation and conduction.

Many shafts which require high pressure seals have keyways, shoulders, or threads at various points between the extremity of the shaft and the desired location of the seal. If the resilient sealing ring be compressed between the collar and the shaft and then forced over the entire length of the shaft, these obstructions, particularly keyways, may cut or chafe the inner surface of the sealing ring to such an extent that adequate sealing between the ring and the shaft when in operative position is seriously impaired. In order to overcome this disadvantage, the spring retainer 16 is first placed in position over the end of the shaft to abut shoulder 15, the uncompressed O ring 7 may then be slipped over and beyond any undesirable cutting surfaces or obstructions on the shaft to a point just outside the outer face of housing 18. Collar 5 may then be slipped over the shaft and squeezed over ring 7, after which the collar and ring may be driven farther along the shaft to their desired position within housing 18. Pressing the collar and ring along the shaft tends to force the ring against the inner face of flange 8 thereby retaining the ring in its maximum effective sealing and pivoting position.

Figure 3:
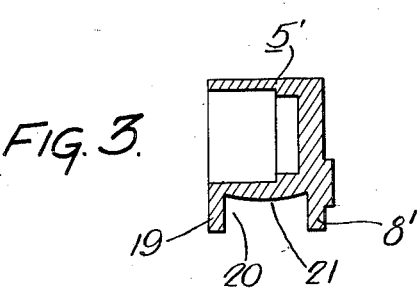
Fig. 3 is a fragmentary detail of a modified form of rotating sealing collar designed for installation on shafts not having keyways and similar obstructions.

On installations where the chafing or cutting action of the shaft presents no problem, a modified collar construction such as illustrated in Fig. 3 may be employed. In this form, the ring may be inserted between shoulders 19 and 8' of groove 20 and then the entire collar assembly can be pressed along the shaft to an operative position. Collar 5' has a convex groove base 21 which provides a similar pivotal action to that already described in connection with collar 5.

The stationary sealing element comprises a washer 22 having a lateral machined surface 23 and a polished sealing surface 24 with an inside and outside diameter substantially the same as that of sealing surface 17. Both washer 22 and collar 5 are preferably made of stainless steel, or other non-corrosive metal, and the sealing surfaces 17 and 24, particularly when stainless steel is used, may be lapped and polished to within three light bands. Radial mounting and alignment of washer 22 is provided by annular bearing 25 which may be integral with washer 22 or formed separately from an impregnated material and pressed into the washer as shown in Fig. 1. The clearance between bearing 25 and shaft 6 is such as to provide accurate radial positioning to washer 22 but is not intended as a sealing surface between the shaft and the washer.

Figure 2:
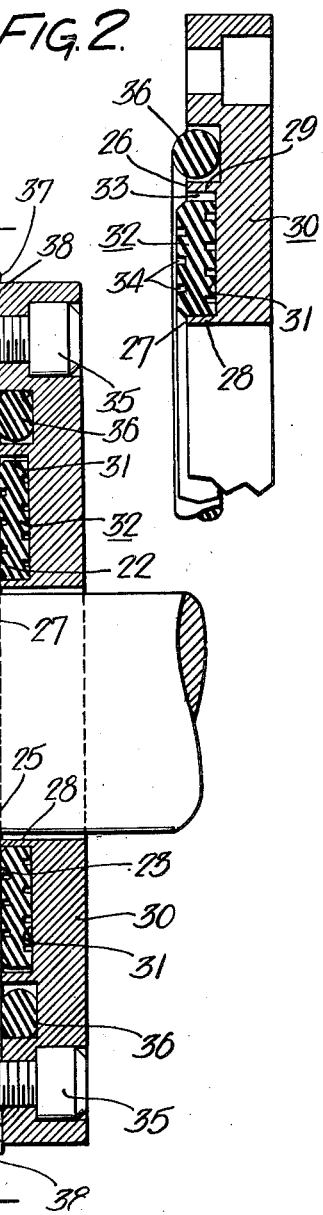
Fig. 2 is a detail of a portion of the end plate showing the resilient stationary sealing element in unloaded condition.

In operative position the machined face 23 of washer 22 lightly rests against machined edges 26 and 27 of annular shoulders 28 and 29 in end plate 30. The shoulders 28 and 29 form an annular groove or recess 31 in plate 30 in which there is positioned a flat resilient sealing washer 32 made of synthetic rubber or a similar material designed to resist attack by whatever liquids or gases may be in contact with it. Washer 32 in an unstressed condition as shown in Fig. 2 seats tightly against the outer diameter of shoulder 28 thereby insuring accurate radial positioning of the washer in the recess 31. However, ample clearance at 33 between the outside diameter of the washer and the outside diameter of the recess is provided to permit expansion of the resilient washer 32 when compressed by metallic washer 22 to the condition illustrated in Fig. 1. Additional compression relief for the rubber washer is provided by concentric grooves 34 which may be located in the washer itself, or if desired, in the end plate 30 and steel washer 22. The axial resilience of washer 32 is such that it compresses just enough to permit the lateral face 33 of washer 22 to rest lightly against the machined surfaces 26 and 27 under pressure of springs 14 thereby permitting axial alignment of the washer through contact with edges 26 and 27 and at the same time insuring an efficient seal between the lateral surface 23 and end plate 30.

When assembled, the end plate 30 is bolted to housing 18 by means of cap screws 35 and effectively sealed with respect to the housing by means of an annular O ring 36. Both the outer surface 37 of the housing 18 and the inner face 38 of end plate 30 are machined to provide accurate positioning of the end plate at right angles of the axis of shaft 6.

Effective sealing between polished surface 17 of collar 5 and surface 24 of washer 22 is provided by an annular seal 39 which is preferably made from a non-metallic material such as carbon and which also has accurately lapped lateral surfaces to contact the surfaces 17 and 24. The inside diameter of seal 39 is slightly greater than the diameter of shaft 6 in order to provide a radial alignment without axial sealing with respect to the shaft. Free relative movement between the floating seal 39 and the surfaces 17 and 24 is permissible so that, if for example, sufficient heat is generated between the seal and surface 24 due to rotation of the seal with the collar, the seal may become stationary with respect to washer 22 and the entire relative rotational movement take place at 17. This action may alternate back and forth between each face of the carbon seal and its corresponding mating metallic surface, or the seal may creep, for example, at one-half shaft speed, thereby providing reduced wearing action on each side of the seal. The alternate wearing of the seal on two surfaces plus the large cooling areas of collar 5 and washer 22 greatly prolong the efficient sealing properties and life of the seal assembly and are particularly important when high pressures and high shaft speeds are encountered.

It will be apparent that the seal assembly is adapted to be entirely contained within an annular recess 40 of a relatively stationary housing 18 for the purpose of reducing space. However, it is entirely feasible to enclose the seal within an annular boss on the housing, or for that matter, it may be contained in a removable bushing. The sealing elements are relatively inexpensive and can be quickly replaced without removing the shaft from the housing. It is not necessary to provide a lapped sealing surface on the shaft, a fact which greatly increases the life of the shaft due to complete elimination of scoring and wear on the shaft.

I claim:

1. In a seal for a rotating shaft, a stationary washer surrounding the shaft, a bearing surface on the inside diameter of the washer adapted to maintain the washer in radical alignment with the shaft, a lapped sealing surface on one side of the washer, a stationary member in which the shaft rotates, an annular recess in said stationary member, a resilient annular compression member positioned in said recess adapted to abut the opposite side of the washer, the dimensions of the recess and the resilient compression member being such as to provide a predetermined sealing pressure on the washer when the compression member is axially compressed by the washer.

2. In a seal for a rotating shaft, a stationary washer surrounding the shaft, a bearing surface on the inside diameter of the washer adapted to maintain the washer in radial alignment with the shaft, a lapped sealing surface on one side of the washer, a stationary member in which the shaft rotates, an annular recess in said stationary member, an axial seat in the recess, an inner annular seat in the recess, an outer annular seat in the recess, said seats forming three walls of the recess, a plurality of concentric relief grooves on the compression member, the dimensions of the recess, washer and compression member being so proportioned that the width of the washer is greater than the width of the recess, and the thickness of the compression member is greater than the depth of the recess whereby the washer seats upon two of the recess walls when the resilient member has been compressed a predetermined amount.

3. In a mechanism comprising a rotatable shaft in a relatively stationary housing having a seal structure comprising a machined surface on the outer face of the housing at right angles to the axis of the shaft, an annular plate bolted to the housing around the shaft and having a machined surface in contact with the machined surface on the housing, an annular seal between the plate and the housing, a pair of annular shoulders on the end plate surrounding the shaft, the lateral edges of the shoulders being machined at right angles to the axis of the shaft and the outer shoulder having a diameter less than the inside diameter of the housing recess, a stationary washer having a machined side adapted to seal against the machined edges of the shoulders, a compressible resilient seal positioned between the shoulders and adapted to be resiliently compressed by one machined surface of the washer to seal the end plate and the washer when the latter is urged against the ends of the shoulders, a bearing surface for the inside diameter of the washer adapted to contact the shaft and retain the washer in radial alignment with the shaft, a collar loosely mounted on the shaft, a resilient driving and sealing member between the collar and the shaft, a lapped lateral surface on the side of the washer opposite the machined side, a lapped lateral surface on the collar facing the lapped surface of the washer, a shoulder on the shaft, a spring retainer abutting the shoulder, and a plurality of springs positioned axially between the spring retainer and the collar and adapted to urge the collar on the resilient mounting to compress the resilient seal and seal the washer on the machined surface of the shoulders.

4. Structure in accordance with claim 3 in which a relatively soft annular seal of greater inside diameter than the shaft is adapted to be compressed between the lapped surfaces of the collar and the washer.

5. Structure in accordance with claim 3 in which the inside diameter of the collar is of convex configuration to permit limited pivotal motion of the collar with respect to the shaft.

OTTO MURRAY SUMMERS.

REFERENCES CITED

The following references are of record in the file of this patent:

UNITED STATES PATENTS

| Number | Name | Date |
|---|---|---|
| 126,624 | Coffee | May 14, 1872 |
| 131,671 | Eils | Sept. 28, 1872 |
| 391,956 | Frager et al. | Oct. 30, 1888 |
| 2,237,494 | McCormack | Apr. 8, 1941 |
| 2,251,219 | Brummer | July 29, 1941 |
| 2,334,548 | Greenlee | Nov. 16, 1943 |
| 2,429,953 | Bottomley | Oct. 28, 1947 |
| 2,444,249 | Estey | June 29, 1948 |
| 2,479,711 | Arutunoff | Aug. 23, 1949 |

FOREIGN PATENTS

| Number | Country | Date |
|---|---|---|
| 149,260 | Austria | of 1937 |